United States Patent
Abe et al.

(10) Patent No.: US 9,651,370 B2
(45) Date of Patent: May 16, 2017

(54) MANUAL MEASURING SYSTEM

(71) Applicant: MITUTOYO CORPORATION, Kawasaki-shi, Kanagawa (JP)

(72) Inventors: Shinsaku Abe, Iwamizawa (JP); Kozaburo Suzuki, Fussa (JP)

(73) Assignee: MITUTOYO CORPORATION, Kawasaki (JP)

( * ) Notice: Subject to any disclaimer, the term of this patent is extended or adjusted under 35 U.S.C. 154(b) by 239 days.

(21) Appl. No.: 14/595,610

(22) Filed: Jan. 13, 2015

(65) Prior Publication Data

US 2015/0211847 A1 Jul. 30, 2015

(30) Foreign Application Priority Data

Jan. 29, 2014 (JP) .................................. 2014-014979

(51) Int. Cl.
*G01B 5/008* (2006.01)
*G01B 21/04* (2006.01)

(52) U.S. Cl.
CPC ............. *G01B 21/04* (2013.01); *G01B 5/008* (2013.01)

(58) Field of Classification Search
CPC ................................. G01B 21/04; G01B 5/008
USPC .......................................................... 33/503
See application file for complete search history.

(56) References Cited

U.S. PATENT DOCUMENTS

| | | | | |
|---|---|---|---|---|
| 5,978,748 A | * | 11/1999 | Raab ................... | G01B 21/047 33/503 |
| 6,131,299 A | * | 10/2000 | Raab ................... | G01B 21/04 33/503 |
| 2008/0052933 A1 | * | 3/2008 | Yamada ................. | G01C 17/28 33/356 |
| 2010/0250175 A1 | * | 9/2010 | Briggs ................... | G01B 5/008 702/91 |
| 2012/0084989 A1 | * | 4/2012 | Pettersson ............ | G01B 21/045 33/503 |
| 2013/0104407 A1 | * | 5/2013 | Lee ........................ | G01B 5/163 33/199 R |
| 2014/0123507 A1 | * | 5/2014 | Gupta .................. | G01B 11/002 33/1 M |
| 2014/0190027 A1 | * | 7/2014 | Abe ...................... | G01B 5/008 33/503 |

(Continued)

FOREIGN PATENT DOCUMENTS

| | | |
|---|---|---|
| JP | 2007-047014 A | 2/2007 |
| JP | 2013-517504 A | 5/2013 |

*Primary Examiner* — G. Bradley Bennett
(74) *Attorney, Agent, or Firm* — Oliff PLC

(57) ABSTRACT

A manual measuring system (an articulated three-dimensional coordinate measuring machine or a gantry three-dimensional coordinate measuring machine) allows a measuring probe to be manually moved while enabling a user to focus on making measurements and allows the user to manually move the measuring probe in order to facilitate and accelerate measurements. The manual measuring system includes a sub-monitor (portable terminal) that is mounted near the tip of the measuring probe. It is possible to display on the sub-monitor a guided route for the measuring probe to a measurement point or to indicate on the sub-monitor that the measuring probe has entered a measurement allowable range or to allow the user to direct by means of the sub-monitor to obtain a measurement value by the measuring probe.

9 Claims, 7 Drawing Sheets

(56) References Cited

U.S. PATENT DOCUMENTS

| | | | | |
|---|---|---|---|---|
| 2014/0237833 A1* | 8/2014 | Schubert | ................ | G01C 9/06 33/365 |
| 2015/0015898 A1* | 1/2015 | Atwell | ................ | G01B 5/008 356/625 |
| 2016/0138937 A1* | 5/2016 | Zhai | ................ | G01C 25/00 73/1.75 |
| 2016/0153767 A1* | 6/2016 | Ihlenfeldt | ............ | G01B 11/005 33/503 |

\* cited by examiner

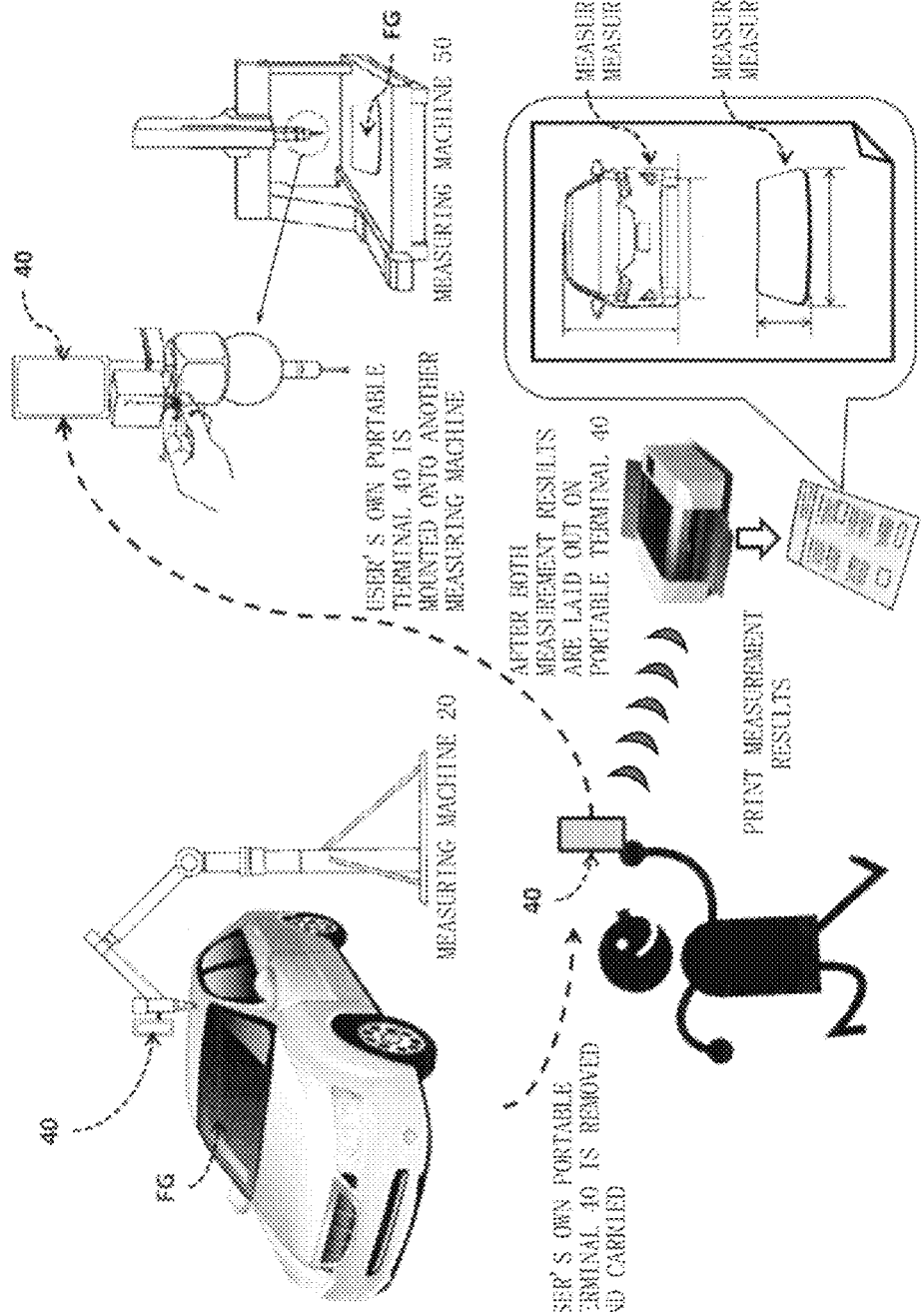

MANUAL MEASURING SYSTEM

CROSS-REFERENCE TO RELATED APPLICATION

The disclosure of Japanese Patent Application No. 2014-014979 filed on Jan. 29, 2014 including specifications, drawings and claims is incorporated herein by reference in its entirety.

TECHNICAL FIELD

The present invention relates to manual measuring systems, and more particularly, to a manual measuring system which allows a measuring probe to be manually moved and which is preferred for use with a manual three-dimensional coordinate measuring machine.

BACKGROUND ART

As illustrated by an articulated three-dimensional coordinate measuring machine 20 in FIG. 1, Japanese Patent Application Laid-Open No. 2007-47014 (hereafter, Patent Literature 1) discloses a manual three-dimensional coordinate measuring machine in which a measuring probe 24 disposed at the tip of an arm mechanism 22 is manually moved. This measuring machine allows the user to measure a work W in a contact or noncontact manner by the measuring probe 24 while referring to design information or measurement conditions that are displayed on a display 32 of a desktop computer 30 (or a dedicated electrical device). In the drawing, reference numeral 26 denotes a tripod for use in supporting the articulated three-dimensional coordinate measuring machine 20 set thereon.

In such a system, a user U checks, for example, a position on the work W that the user U has to measure on the display 32 of the desktop computer 30 and makes measurements while checking the position against the actual position on the work W. That is, each time a measurement is made, the user U repeats the action of alternately looking at the display 32 and the work W. It is conceivable that depending on the size of the work W or the measurement situation, the user U cannot directly, visually observe the display 32. It is primarily expected that the user U may obtain measurement results more efficiently with higher reliability without much deviating the line of sight from the work W each time measurements are made. However, it is a significant drawback with this system that the user U is expected to direct the line of sight to the display 32 of the desktop computer 30.

FIG. 2 illustrates an example in which the system is connected to a notebook computer (notebook PC) 34. In this case, the notebook PC 34 can be set up near the work W and thus provide improvements when compared with the system with the desktop computer, allowing the user U to view the display more easily while making measurements than with the desktop computer. However, in most cases, since the line of sight is still deviated, measurements are interrupted to view the details being displayed. There may also be cases where depending on the size of the work W or the measurement environment, even the notebook PC 34 cannot be placed nearby and thus the display cannot not be directly, visually observed. This leads to the same problem as that with the desktop computer.

Note that disclosed in Japanese Translation of PCT Patent Application Publication No. 2013-517504 (hereafter, Patent Literature 2) is an electrical device unit which includes an open/close type display near the base of the articulated arm coordinates measuring machine.

Furthermore, disclosed in the specification of U.S. Pat. No. 6,131,299 (hereafter, Patent Literature 3) is that a screen capable of displaying texts is provided at the tip of an arm.

However, even in the technique disclosed in Patent Literature 3, since the text screen is mounted on the arm tip, appropriate navigation or measurement instructions could not be provided.

For example, there was also a problem that test gages and test jigs used for automobiles parts were used to measure a designated point; however, as illustrated in FIG. 3, the user could not locate the actual position on the work W, and it was thus difficult to measure the designated point with the articulated three-dimensional coordinate measuring machine.

SUMMARY OF INVENTION

Technical Problem

The present invention was made to solve the problems in association with the conventional techniques. The problems have been solved by including a sub-monitor mounted near the tip of a measuring probe in a manual measuring system which allows the measuring probe to be manually moved.

Here, it is possible to display, on the sub-monitor, a guided route for the measuring probe to a measurement point.

It is also possible to display, on the sub-monitor, a content in which the measuring probe is in a measurement allowable range.

It is also possible to direct, by means of the sub-monitor, to obtain a measurement value by the measuring probe.

It is also possible to employ a touch panel display as the sub-monitor.

It is also possible to employ a portable terminal as the sub-monitor.

It is also possible to mount the sub-monitor via a link mechanism.

It is also possible to make the sub-monitor detachable from the manual measuring system.

It is also possible to employ the manual measuring system as an articulated three-dimensional coordinate measuring machine.

Furthermore, the articulated three-dimensional coordinate measuring machine can have the measuring probe configured to measure a work and have a tip in a predetermined shape, and an articulated arm mechanism which includes a base, a plurality of arms, joints between the arms, and the measuring probe.

It is also possible to construct the arm mechanism as a passive configuration having no driving source.

It is also possible to employ the manual measuring system as a gantry manual three-dimensional coordinate measuring machine.

The manual three-dimensional coordinate measuring machine may also include: a table on which a work is placed; a gantry frame capable of moving relative to the table; a slider capable of moving on the gantry frame; a spindle capable of moving on the slider; and the measuring probe mounted on the spindle.

Even when the computer display cannot be directly visually observed, the present invention enables a user to check the information of the control software immediately nearby and thereby concentrate on performing a measurement without deviating the line of sight and without interrupting the measurement.

Thus, the following effects may be produced.

(1) Reduction of Time for Measurement

It is possible to significantly reduce measurement time because there is no need to interrupt the measurement and then check the display in order to confirm the displayed details of the contents of the control software.

(2) Improvement of Quality of Measurement

The measurement information can be confirmed in the same field of view as that of the work while the measuring probe is held. This can eliminate unnecessary motions and thus allows the user to concentrate on the measurement, thereby providing improved measurement quality.

(3) Reduction of Mistakes in Measurement

A guided route may be displayed and navigated to a measurement point on the sub-monitor, thereby allowing the user to make measurements while checking the actual measurement position on the work against the navigation information displayed on the sub-monitor. It can thus be expected to reduce mistakes in measurement.

(4) Improvement of Usability

For the sub-monitor that is a touch panel display, since touch panel operations can control the control software, this allows most of operations to be performed at hand and can provide significantly improved usability.

(5) Results can be Checked without Operating the Computer

To check measurement results of the work, in a conventional situation, (during a measurement, the user released the measuring probe once and then moved to the place of the computer and then) the user was required to operate, for example, the mouse of the computer and thereby rotated, moved, or zoomed in or out the work figure displayed on the screen so as to view the position that the user wanted to check. However, according to the present invention, the user can check the results on the sub-monitor while holding the measuring probe.

(6) Design Values can be Checked while Viewing the Actual Work

Conventionally, for the design value of each portion of a work to be measured, the user was required to confirm CAD data displayed on CAD drawings (paper) or the display screen and check the data against the work immediately before the user so as to temporarily memorize required design values. According to the present invention, by directing the measuring probe to the portion of which design value is desired to be checked, it is possible to display, on the sub-monitor, the design value of the measurement position designated by the measuring probe. The user is thus not required to memorize the design value.

(7) Effective when the Display of the Computer Cannot be Viewed (Viewed with Difficulty)

For a large work, conventionally, when the display of the computer was hidden behind the work and thus could not be directly visually observed or when the display was placed too far away from the user to check displayed details, the computer had to be relocated each time this situation arose or the measurement had to be interrupted and then the user had to move to the place of the computer. However, according to the present invention, neither the computer nor the user has to be relocated. What is required is to view the sub-monitor close at hand, and thus in most cases, it is unnecessary to check on the display that is directly connected to the computer.

(8) Control Software can be Controlled Close at Hand

In most cases, control software has to be controlled by operating a menu or the like with the mouse or the keyboard. For a compact measuring machine and a notebook PC available nearby, the computer may be operated by one hand while the other hand holds the measuring probe. However, in most cases, the one hand has to be released from the measuring probe so as to operate the computer with both hands. For the computer located far away, it is not rare for the user to move. However, the sub-monitor which is a touch panel display allows the user to operate the control software on the touch panel of the sub-monitor mounted close at hand. This provides significantly improved usability.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein;

FIG. 12 is a perspective view illustrating an entire configuration of a third embodiment of the present invention.

DESCRIPTION OF EMBODIMENTS

Embodiments of the present invention will be described below in detail with reference to the drawings. It should be noted that the present invention is not limited by the descriptions of the embodiments and examples described below. In addition, the constituent components of the embodiments and examples described below may include those that a person skilled in the art can easily devise and those that are substantially the same, that is, those within the equivalent scope of the invention. Furthermore, the components described in the embodiments and examples described below may be combined as appropriate or selected as appropriate for use.

First, a description will be made to the configuration of an articulated three-dimensional coordinate measuring machine 20 according to an embodiment.

Figure 1:
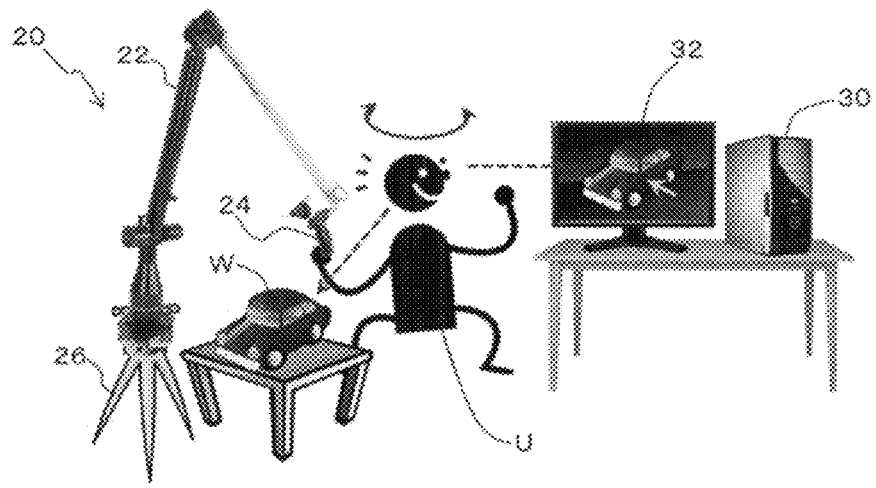
FIG. 1 is a perspective view illustrating an example of making measurements using a conventional articulated three-dimensional coordinate measuring machine and a desktop computer.
Figure 2:
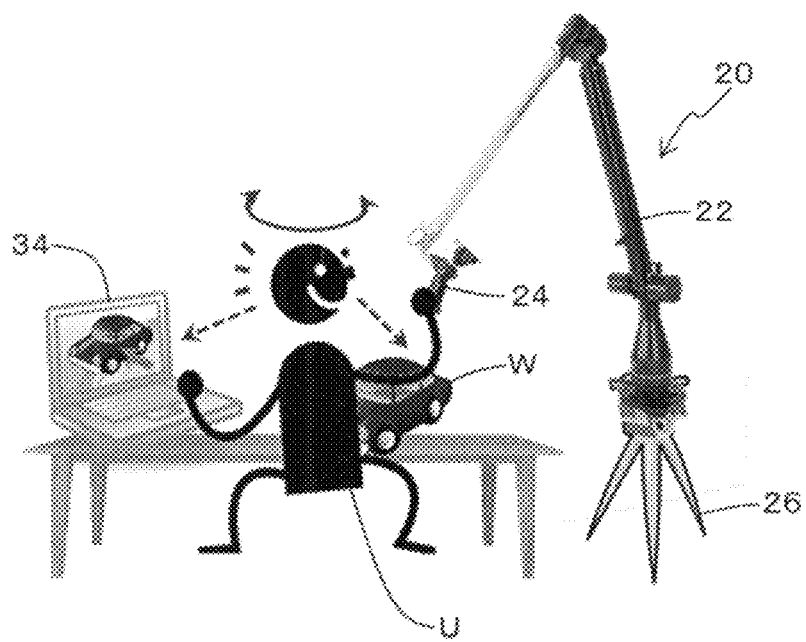
FIG. 2 is a perspective view illustrating an example of making measurements using a conventional articulated three-dimensional coordinate measuring machine and a notebook PC.
Figure 3:
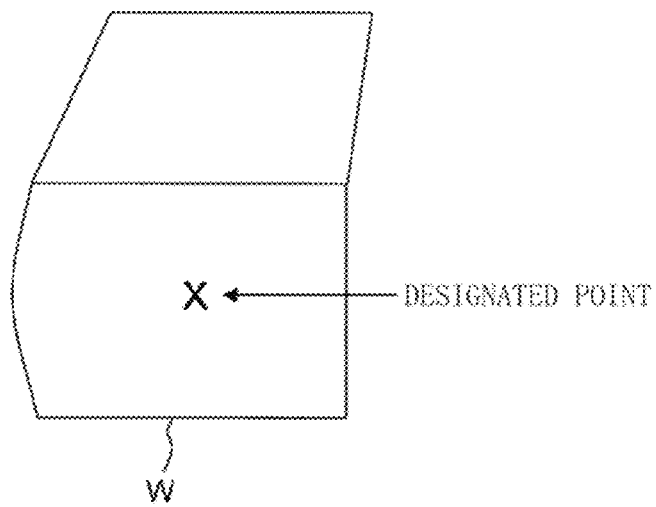
FIG. 3 is an explanatory perspective view illustrating conventional problems.
Figure 4:
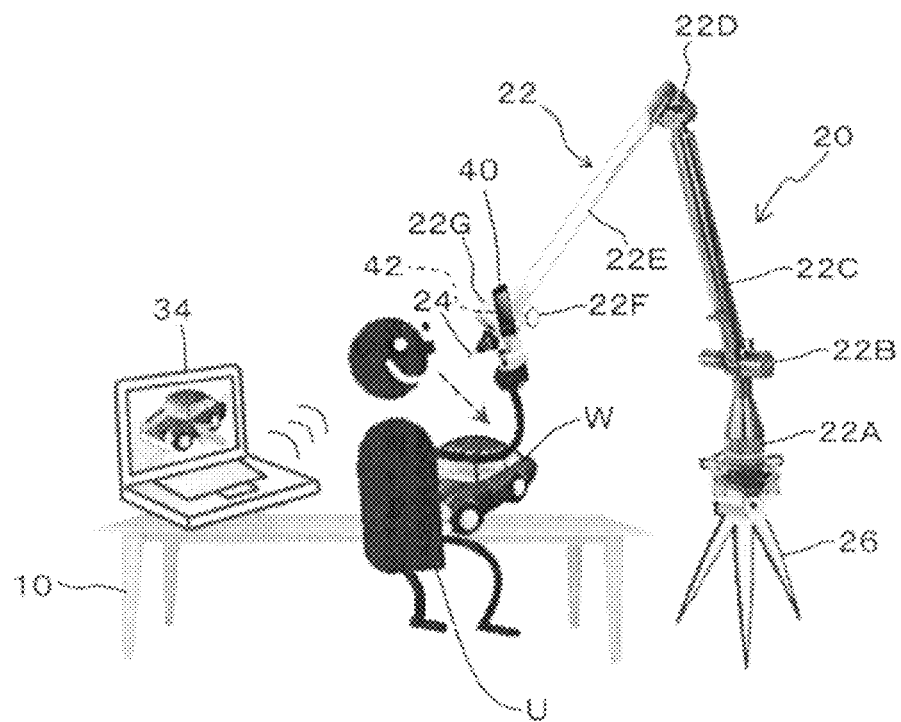
FIG. 4 is a perspective view illustrating an entire configuration of a first embodiment of the present invention.

As illustrated in FIG. 4, the articulated three-dimensional coordinate measuring machine 20 has a measuring probe 24 and an articulated arm mechanism 22. The measuring probe 24 is to measure a work W, with the tip thereof (the probe tip) formed, for example, in the shape of a ball. As illustrated in FIG. 4, the arm mechanism 22 is configured such that a base portion 22A supports a first arm 22C via a first joint 22B; the first arm 22C supports a second arm 22E via a second joint 22D; and the second arm 22E supports an arm head 22G via a third joint 22F. The arm head 22G, which is located at the tip of the arm mechanism 22, includes the measuring probe 24. The first joint 22B, the second joint 22D, and the third joint 22F are rotatable in the axial directions that are orthogonal to each other and have two built-in rotary type encoders (not illustrated) that can detect rotational angles. That is, the arm mechanism 22 of this embodiment has six axes. (The invention may not be limited thereto, and the arm mechanism 22 may also have, for example, seven axes.) With this configuration, it is possible to locate the position (coordinates) of the measuring probe 24 on the basis of outputs from all of these encoders. The base portion 22A may be directly disposed on a work bench 10 on which the work W is placed, or alternatively may also be disposed on the tripod 26.

Figure 5:
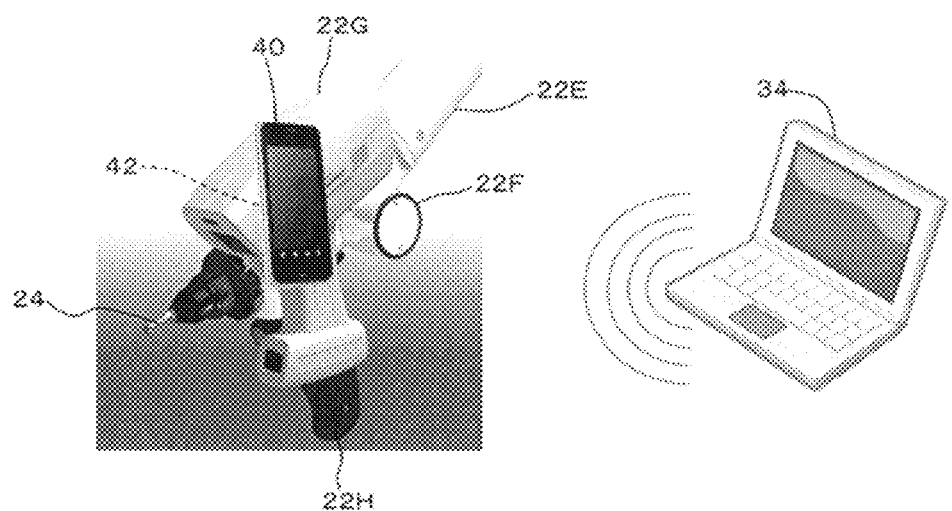
FIG. 5 is an enlarged perspective view illustrating a configuration of a main section of the first embodiment.

To measure the three-dimensional coordinate shape of the work W by the articulated three-dimensional coordinate measuring machine 20, a user U holds and manipulates a grip 22H, which is provided on the arm head 22G as illustrated in FIG. 4 and FIG. 5, so as to manually move the measuring probe 24. That is, the articulated three-dimensional coordinate measuring machine 20 has a passive configuration which has no driving source on the axes of the arm mechanism 22. Then, the user U can bring the measuring probe 24 closer to the work W in any direction and into contact therewith at any angle. Then, the user U can manipulate a switch (not illustrated) so as to switch between ON and OFF for the measurement of the work W.

A first embodiment of the present invention is the aforementioned articulated three-dimensional coordinate measuring machine 20 to which the present invention is applied. That is, as illustrated in detail in FIG. 5, a portable terminal (so-called smartphone) 40 having a touch panel display is mounted as a sub-monitor near the tip of the measuring probe 24 via an angle-variable link mechanism 42 illustrated in FIG. 6.

The link mechanism 42 enables the user U to adjust the position and angle of the portable terminal 40 during a measurement and improves the visibility of the portable terminal 40 and the point of measurement. Note that the link mechanism 42 may also be omitted.

The portable terminal 40 is connected to a desktop computer or a notebook PC 34 in wired or wireless communication therewith and functions to allow measurement information transmitted by control software of the notebook PC 34 to be displayed as text data or graphic data on the portable terminal 40 or informed by sound or speech. Furthermore, the portable terminal 40 can also transmit information entered on the touch panel display of the portable terminal 40 and information entered by speech recognition to control software of the notebook PC 34, and thus can provide control on the portable terminal 40 to the control software.

Figure 7:
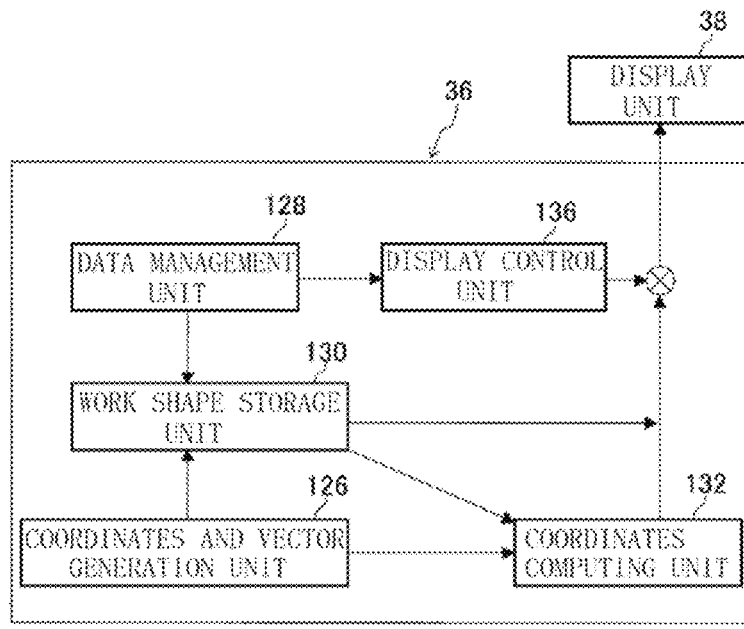
FIG. 7 is a block diagram illustrating a configuration of a processing unit of the first embodiment.

As an example, FIG. 7 illustrates the configuration of a processing unit 36 included in the notebook PC 34. As illustrated in detail in FIG. 7, the notebook PC 34 includes the processing unit 36 and a display unit 38. The processing unit 36 includes a coordinates and vector generation unit 126, a data management unit 128, a work shape storage unit 130, a coordinates computing unit 132, and a display control unit 136.

The coordinates and vector generation unit 126 produces the position (coordinates) of the tip of the measuring probe 24 on the basis of an output from the articulated three-dimensional coordinate measuring machine 20 (an output from the encoders). At the same time, the direction vector of the tip of the measuring probe 24 (the direction in which the measuring probe 24 is oriented) is produced.

The data management unit 128 processes a command from an input unit (not illustrated) or the portable terminal 40 and then provides various instructions to the work shape storage unit 130 and the display control unit 136. Furthermore, the data management unit 128 instructs conditions for measurements by the measuring probe 24.

The work shape storage unit 130 stores design information DI such as design shapes and design values of the work W to be measured which are obtained, for example, from three-dimensional CAD data. Note that the work shape storage unit 130 is configured such that the design information DI is information obtained on the coordinate system (work coordinate system) when making measurements by the measuring probe 24 (i.e., the design information DI of the work W stored in the work shape storage unit 130 is calibrated to the information obtained on the work coordinate system by measuring multiple times the characteristic coordinates of the work W in advance by the measuring probe 24). Furthermore, the work shape storage unit 130 also stores, for example, information on measured positions including measurement value information of the work W outputted from the coordinates and vector generation unit 126. Note that the data management unit 128 identifies, for example, a position to be measured or the design values of the work W in the design information DI of the work W.

The coordinates computing unit 132 calculates the distance to the work W by the work shape storage unit 130 on the basis of the position of the measuring probe 24 produced at the coordinates and vector generation unit 126. Furthermore, on the basis of the direction vector of the measuring probe 24 produced at the coordinates and vector generation unit 126, the coordinates computing unit 132 calculates the direction of navigation, allowing the resulting direction of navigation to be displayed on the display of the display unit 38 or the portable terminal 40.

Figure 8:
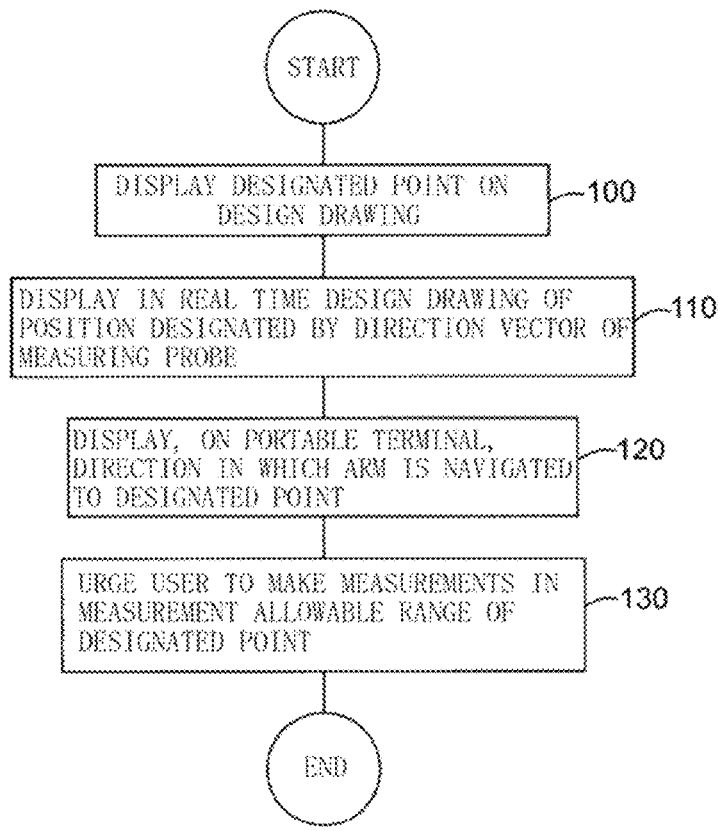
FIG. 8 is a flow chart illustrating an example of a measurement procedure of the first embodiment.

Now, referring to FIG. 8, a description will be made to the processing of navigation for measuring a designated point.

First, in step 100, the designated point is displayed on a design drawing.

Then, in step 110, the design drawing of the position designated by the direction vector of the measuring probe 24 is displayed in real time.

Then, in step 120, the direction in which the arm is moved to the designated point is displayed on the portable terminal 40 for navigation.

Then, in step 130, the process directs to make a measurement when the tip of the measuring probe 24 enters in a measurement allowable range of the designated point.

Figure 9:
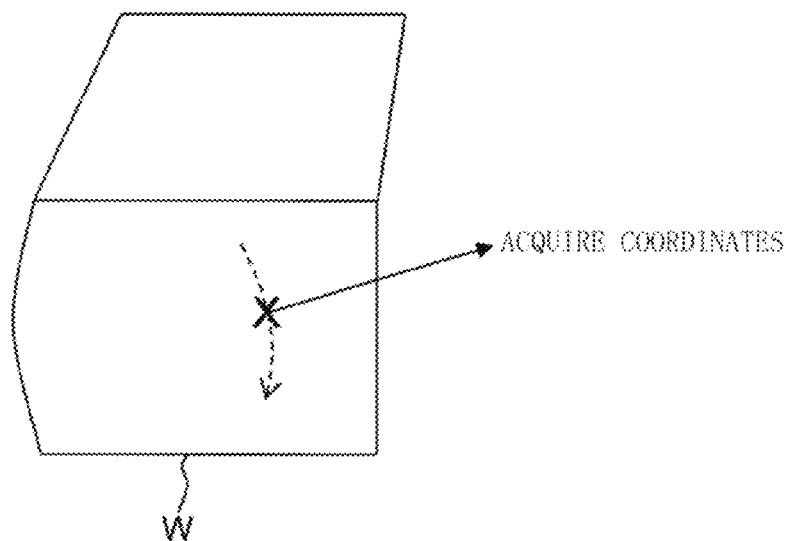
FIG. 9 is a perspective view illustrating an effect of the first embodiment.

In this manner, as illustrated in FIG. 9, the measuring probe 24 may scan the vicinity of the designated point until the coordinates of the designated point can be obtained and then acquire the coordinates when passing through the designated point.

At this time, it is possible to record comments associated with the measurement position with the help of the speech input function of the portable terminal 40. It is also possible to acquire an image with the help of the camera function so as to zoom in or out or scale for display on the display unit 38 of the notebook PC 34 or the portable terminal 40, with the displayed details on the portable terminal 40 varied depending on the position of the measuring probe 24.

Now, a description will be made to a gantry manual three-dimensional coordinate measuring machine according to a second embodiment of the present invention.

Figure 10:
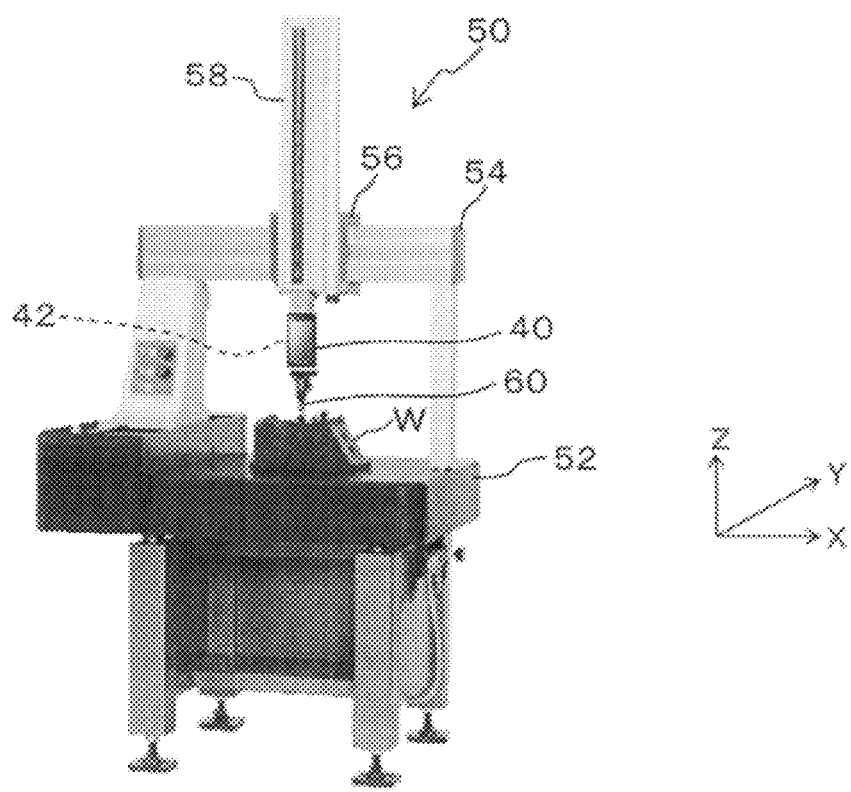
FIG. 10 is a perspective view illustrating an entire configuration of a second embodiment of the present invention.

As illustrated in FIG. 10, the gantry three-dimensional coordinate measuring machine 50 includes: a table 52 on which a work W is placed; a gantry frame 54 which is movable in the depth direction (Y direction) of the figure relative to the table 52; an X-axis slider 56 which is movable from side to side (in the X direction) of the figure on the gantry frame 54; a Z-axis spindle 58 which is movable in the vertical direction (Z direction) of the figure on the X-axis slider 56; and a measuring probe 60 secured to the tip (the lower end in the drawing) of the Z-axis spindle 58. The measuring machine 50 is configured to measure the shape of the work W by manually moving the measuring probe 60.

The gantry frame 54, the X-axis slider 56, and the Z-axis spindle 58 each include a built-in linear encoder (not illustrated) for detecting positions and the amount of travel in the direction of the X-, Y-, or Z-axis.

Figure 6:
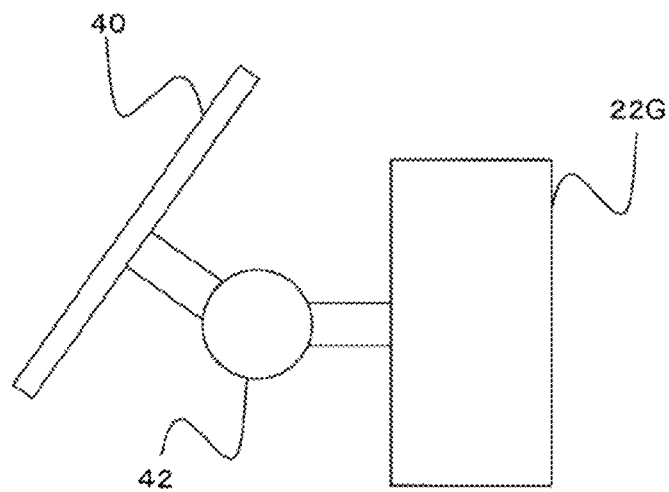
FIG. 6 is a side view illustrating a link mechanism of the first embodiment.
Figure 11:
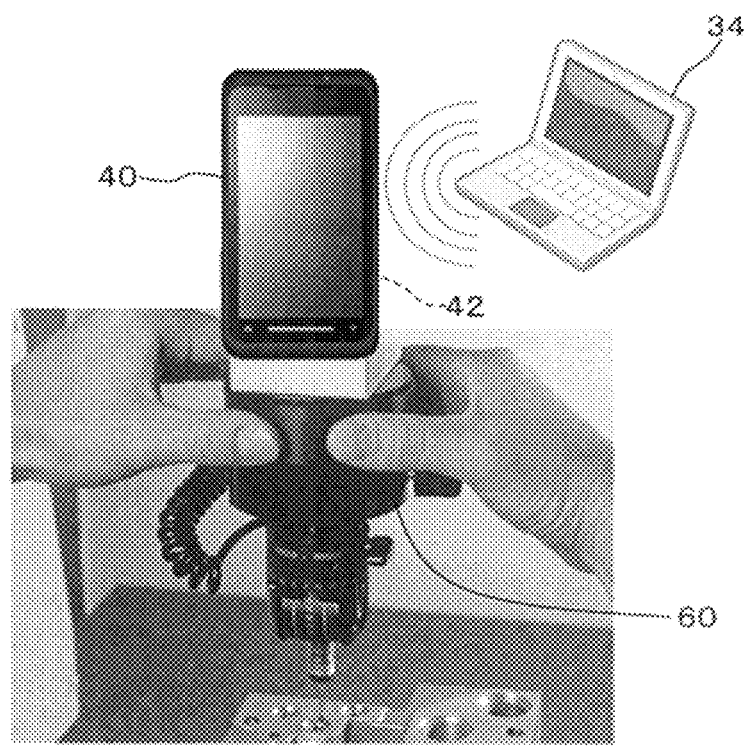
FIG. 11 is an enlarged perspective view illustrating a configuration of a main unit of the second embodiment.

According to the second embodiment of the present invention, as illustrated in detail in FIG. 11, the gantry three-dimensional coordinate measuring machine 50 described above is configured such that the portable terminal 40 is mounted, via the link mechanism 42 as illustrated in FIG. 6, on the Z-axis spindle 58 near the measuring probe 60. The operation concerning the portable terminal 40 is substantially the same as that in the first embodiment, and thus detailed explanation will be omitted.

Note that in all the embodiments above, a smartphone is used as the sub-monitor, thereby allowing for implementing the present invention at ease and low costs. Note that the type of the sub-monitor is not limited thereto. For example, it is also possible to mount a compact tablet PC or a dedicated small monitor.

Furthermore, in all the embodiments above, the portable terminal 40 is connected to the notebook PC 34, but may also be connected to a server or a host computer through a cloud. In this case, the latest data can be downloaded.

Furthermore, as illustrated in FIG. 12 as a third embodiment, the portable terminal 40 may be made detachable from the measuring machines 20 and 50. In the drawing, FG denotes a common front glass (windshield) to be measured. In this case, the portable terminal 40 may be removed from one measuring machine (20 in the drawing) and then attached to the other measuring machine (50 in the drawing) so as to be connected to a control PC of the measuring machine 50. It is thus possible to share the portable terminal 40 among the plurality of measuring machines 20 and 50. If wired, the portable terminal 40 is connected or disconnected only when being attached or detached (a pairing operation is required in case of wireless Bluetooth (trade mark)), allowing one portable terminal 40 to hold the states of the plurality of measuring machines 20 and 50. For example, to compare the measurement results of the measuring machine 20 with the measurement results of the measuring machine 50, what could be conventionally done was to print the respective measurement results by a printer on a sheet of paper for comparison, or to copy the measurement results of one of the machines to the control PC connected to the other machine and then lay out the results by document software for printing. However, according to this embodiment, it is possible to hold the measurement results of both the measuring machines 20 and 50 in one portable terminal 40 (at the same time as the end of the measurement) and thus allow the measurement results for a comparison to be printed by instructing on the portable terminal 40. It is thus possible to provide significantly improved convenience to users.

On the other hand, the software to be used for measurement control can be customized with great flexibility. However, for a plurality of users to make measurements while sharing one control PC, it may be sometimes impossible (difficult) for each user to customize the software for ease of use. However, this embodiment is configured such that the portable terminal 40 each user owns can be customized for dedicated use by the user without causing any inconvenience to the other users, thus implementing improved personal operation.

Note that the third embodiment is configured to combine, as the plurality of measuring machines, the articulated three-dimensional coordinate measuring machine 20 and the gantry three-dimensional coordinate measuring machine 50. However, the combination of a plurality of measuring machines is not limited thereto and the number of machines is not limited to two, neither.

Furthermore, all the embodiments above are configured such that the present invention is applied to the three-dimensional coordinate measuring machine. However, without being limited thereto, the present invention can also be generally applied to manual measuring systems which enable the measuring probe to be manually moved.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the invention.

The invention claimed is:

1. An articulated manual measuring system with a measuring probe configured to be manually moved, comprising:
    the measuring probe configured to measure a work and having a tip in a predetermined shape;
    an articulated arm mechanism that includes a base, a plurality of arms, joints between the arms, and an arm head with the measuring probe; and
    a sub-monitor mounted on the arm head.

2. The articulated manual measuring system according to claim 1, wherein a guided route for the measuring probe to a measurement point is configured to be displayed on the sub-monitor.

3. The articulated manual measuring system according to claim 1, wherein a content in which the measuring probe is in a measurement allowable range is configured to be displayed on the sub-monitor.

4. The articulated manual measuring system according to claim 1, wherein the manual measuring system is configured to be directed, by means of the sub-monitor, to obtain a measurement value by the measuring probe.

5. The articulated manual measuring system according to claim 1, wherein the sub-monitor is a touch panel display.

6. The articulated manual measuring system according to claim 5, wherein the sub-monitor is a portable communication terminal.

7. The articulated manual measuring system according to claim 1, wherein the sub-monitor is mounted via a link mechanism.

8. The articulated manual measuring system according to claim 1, wherein the sub-monitor is configured to be detachable from the articulated manual measuring system.

9. The articulated manual measuring system according to claim 1, wherein the articulated manual measuring system is an articulated three-dimensional coordinate measuring machine.

* * * * *